US006174275B1

(12) United States Patent
Janusa

(10) Patent No.: US 6,174,275 B1
(45) Date of Patent: Jan. 16, 2001

(54) PROCESSES FOR IMMOBILIZING WASTE USING BAGASSE

(75) Inventor: Michael A. Janusa, Thibodaux, LA (US)

(73) Assignee: Nicholls State University, Thibodaux, LA (US)

(*) Notice: Under 35 U.S.C. 154(b), the term of this patent shall be extended for 0 days.

(21) Appl. No.: 09/383,786

(22) Filed: Aug. 26, 1999

(51) Int. Cl.⁷ .................. B09B 3/00; A62D 3/00; C04B 18/04

(52) U.S. Cl. .............. 588/257; 106/697; 106/724; 106/731; 106/805; 106/823; 588/252; 588/256; 588/257

(58) Field of Search .................. 106/697, 724, 106/731, 805, 823; 588/252, 256, 257

(56) References Cited

U.S. PATENT DOCUMENTS

| 3,748,160 | * | 7/1973 | Carbajal | 106/609 |
|---|---|---|---|---|
| 4,240,800 | | 12/1980 | Fischer | 44/51 |
| 4,908,099 | | 3/1990 | DeLong | 162/21 |
| 5,078,795 | | 1/1992 | Conner et al. | 106/624 |
| 5,498,337 | | 3/1996 | Leon-Betanzos et al. | 210/610 |
| 5,536,898 | | 7/1996 | Conner et al. | 588/252 |
| 5,545,418 | | 8/1996 | Iritani et al. | 426/53 |
| 5,554,575 | | 9/1996 | Cutler et al. | 502/404 |
| 5,683,344 | | 11/1997 | Channell et al. | 588/257 |
| 5,744,107 | | 4/1998 | Fristad et al. | 423/1 |

OTHER PUBLICATIONS

Guidry, Edward "Bagasse Could be Useful to Environment", copy of Newspaper Article, The Courier, Mar. 7, 1998 1 page.
"Bagasse Role in Encapsulating Hazardous Waste Examined" The Daily Review, Mar. 9, 1998, 1 page.
Janusa et al., Presentation Abstract #203, "Designing a Better Matrix for Solidification/Stabilization of Hazardous Waste With the Aid of Bagasse (Lignin) as a Polymer Additive to Cement", 211th American Chemical Society National Meeting & Exposition Program, 1996, 2 pages, (no month).
Janusa et al., Presentation Abstract #302, "Designing a Better Matrix for Solidification/Stabilization of Hazardous Waste With the Aid of Bagasse (Lignin) as a Polymer Additive to Cement", CHED Newsletter published by the Division of Chemical Education, Inc., American Chemical Society, 1996, 2 pages, (no month).
Jones et al., paper entilted "Factors Affecting Stabilization/Solidfication of Hazardous Waste", believed to have been presented at a conference in Sep., 1985, in Pittsburg, PA, pp. 320–327.
Flynn, Jr. et al., "Adsorption of Heavy Metal Ions by Xanthated Sawdust", Bureau of Mines Report of Investigations 8427, 1980, 15 pages, (no month).
Bricka, Mark R., "Investigation And Evaluation of the Preformance of Solidfied Cellulose and Starch Xanthate Heavy Metal Sludges", Waterways Experiment Station, Corps of Engineers, Final Report, 1988, 55 pages, (no month).
Janusa et al., "Effects of Particle Size and Contact Time on the Reliability of Toxicity Characteristic Leaching Procedure for Solidified/Stabilized Waste", Microchemical Journal, vol. 59, Article No. MJ981601, pp. 326–332, (Feb. 1998).
Janusa et al., Effects of Curing Temperature on the Leachability of Lead Undergoing Solidfication/Stabilization with Cement, Microchemical Journal, vol. 60, ARticle No. MJ981654, pp. 193–197, (Jul. 1998).
Untitled Poster Presented at 1996 Am. Chem. Soc. Meeting, 20 pages, (no month).
Patineau, "By Products of the Cane Sugar Industry", Elsevier, New York, 1989, pp. 174–176, (no month).
Chen et al., "Cane Sugar Handbook a Manual for Cane Sugar Manufacturers and Their Chemists", Twelfth Edition, 1993, John Wiley & Sons, Inc., pp. 375–396, (no month).
Allemond, Kelly, "Assistant Professor Researches Ways to Dispose of Sugar Cane", Newspaper article, The Nicholls Worth, Mar. 19, 1998, 1 page.
Chemical Abstract No. 102:136683, abstract of an article by Lopez et al entitled "Substitution of bagasse fibers for asbestos in asbestos cement products", Sobre Deriv. Cana Azucar (1984), (no month).*
Chemical Abstract No. 123:16120, abstract of an article by Aggarwal entitled "Bagasse–reinforced cement composites", Cem. Concr. Compos. (1995), (no month).*
Chemical Abstract No. 124:35834, abstract of an article by Baguant entitled "Properties of concrete with bagasse ash as fine aggregate", Am. Concr. Inst. (1995), (no month).*
Chemical Abstract No. 126:254449, abstract of an article by Basta et al entitled "Lignocellulosic materials in building elements", Polym. Polym. Compos. (1996), (no month).*
Derwent Abstract No. 1990–091463, abstract of Chinese Patent Specification No. 1032331 (Apr. 12, 1989).*
Derwent Abstract No. 1977–65911Y, abstract of Japanese Patent Specification No. 52–093432 (Aug. 5, 1977).*

* cited by examiner

Primary Examiner—Anthony Green
(74) Attorney, Agent, or Firm—Sieberth & Patty, L.L.C.

(57) ABSTRACT

A process for solidifying and stabilizing waste, the process comprising (a) combining bagasse and a liquid medium having a pH below about 4 or above about 10 to form a mixture, (b) heating the mixture, (c) separating the mixture into solid matter and filtrate and washing the solid matter with a liquid in which sugar is soluble, (d) substituting the solid matter for the bagasse in (a) and repeating steps (a) through (c) until the filtrate is substantially colorless under ambient light conditions, thereby producing washed solid matter, (e) combining at least a portion of the washed solid matter with at least (1) the waste, (2) water, and (3) a cement, so as to form a cement slurry, and (f) curing the cement slurry. Cementitious products formed by processes of this invention.

25 Claims, No Drawings

PROCESSES FOR IMMOBILIZING WASTE USING BAGASSE

TECHNICAL FIELD

This invention relates to processes for immobilizing waste in solid or semi-solid matrices.

BACKGROUND

The processing of sugar cane milling or diffusing to make refined sugar and other products every year generates large amounts of a biomass byproduct commonly known as bagasse. Many have sought methods of disposing of or utilizing bagasse, in view of the millions of tons produced each year and the problems associated with disposal of large amounts of this particular organic byproduct. At the same time, the handling and disposal of many toxic or otherwise hazardous forms of waste produced by modem society have proven difficult and hazardous to those who handle or are in close proximity to such toxic waste. Various processes have been proposed to address the problem of hazardous waste disposal, including the use of various solidification and stabilization processes. Some of the proposed solidification and stabilization processes incorporate the use of cement for economic reasons. However, the amount of leaching prevalent in systems which rely heavily on cement alone has proven unsatisfactory. In addition, so far as is known, no previously developed process has successfully combined the features of a process which efficiently solidifies and stabilizes hazardous waste with a process for the efficient utilization of bagasse.

THE INVENTION

The present invention is deemed to provide at once both a highly effective and efficient method for properly solidifying and stabilizing hazardous waste, and a productive use for the major sugar cane processing byproduct, bagasse. In one aspect of this invention, a process for solidifying and stabilizing waste is provided. The process comprises (a) combining bagasse and a liquid medium having a pH below about 4 or above about 10 to form a mixture, (b) heating the mixture, (c) separating the mixture into solid matter and filtrate and washing the solid matter with a liquid in which sugar is soluble, (d) substituting the solid matter for the bagasse in (a) and repeating steps (a) through (c) until the filtrate is substantially colorless under ambient light conditions, thereby producing washed solid matter, (e) combining at least a portion of the washed solid matter with at least (1) the waste, (2) water, and (3) a cement, so as to form a cement slurry, and (f) curing the cement slurry. Preferably, this process further comprises the step of maintaining the mixture at least at one temperature in the range of about 80 to about 120° C. for a period of at least about 30 minutes, measured from the point in time at which the mixture reaches at least one temperature in the specified range, prior to separating the mixture into solid matter and filtrate. More preferably, the temperature(s) is/are in the range of about 90 to about 110° C., and the period of time during which the mixture is maintained at a temperature in the specified range is at least about 60 minutes, measured from the point in time at which the mixture reaches at least one temperature in the specified range. It also is preferred that, before combining the washed solid matter with at least the waste, water and the cement to form the cement slurry, at least the following additional steps are carried out:

(a) drying at least a portion of the washed solid matter, and (b) pulverizing at least a portion of the washed solid matter so that the washed solid matter has an average particle size in the range of about 100 to about 500 microns, more preferably in the range of about 150 to 350 microns.

The step of combining the washed solid matter with at least the waste, water and cement to form the cement slurry in processes of this invention is preferably carried out by (a) mixing at least a portion of the washed solid matter with the waste and water to form a waste slurry, (b) maintaining at least a portion of the waste slurry in a substantially quiescent state for a period of at least 30 minutes, and more preferably for a period of at least 60 minutes, and (c) combining at least a portion of the waste slurry with the cement to form the cement slurry. Without being bound to theory, it is believed that either this procedure or the pulverization procedure described above, or both, enable particularly satisfactory binding between the waste molecules and the other slurry components to produce a particularly waste-stable cementitious solid product.

In another preferred embodiment of this invention, the process comprises:

(a) combining bagasse and a liquid medium having a pH below about 3 or above about 12 to form a mixture, (b) heating the mixture and maintaining the mixture at least at one temperature in the range of about 90 to about 110° C. for a period of at least about 30 minutes, (c) separating the mixture into solid matter and filtrate and washing the solid matter with a liquid in which sugar is soluble, (d) substituting the solid matter for the bagasse in (a) and repeating steps (a) through (c) until the filtrate is substantially colorless under ambient light conditions, thereby producing washed solid matter, (e) drying the washed solid matter, (f) pulverizing at least a portion of the washed solid matter so that the washed solid matter has an average particle size in the range of about 100 to about 500 microns, (g) mixing at least a portion of the washed solid matter with the waste and water to form a waste slurry, (h) maintaining at least a portion of the waste slurry in a substantially quiescent state for a period of at least 30 minutes, (i) combining at least a portion of the waste slurry with a cement to form a cement slurry, and (j) curing the cement slurry at least at one temperature in the range of about 20 to about 30° C.

The invention also provides cementitious products formed by the practice of processes of this invention. The resulting solid cementitious products exhibit exceptional stabilization of waste, measured by low levels of waste leaching, as compared to controls which do not include material derived from bagasse. Such cementitious products can be useful as, for example, as fill material in a variety of products and settings in which solid cement is commonly employed.

These and other embodiments and features of this invention will be still further apparent from the ensuing description and appended claims.

DETAILED DESCRIPTION OF PREFERRED EMBODIMENTS

The processes of this invention enable the effective use of components of bagasse, including lignin, to stabilize and trap hazardous waste within solidified cementitious matrices, thus putting to great use what heretofore has been an organic waste byproduct. Typical wastes for which processes of this invention may be utilized include, for example, wastes comprised of heavy metal compounds containing metals such as, e.g., arsenic, cadmium, chromium, and/or lead. However, the processes of this invention are not necessarily limited to use with heavy metal waste, but rather may be used for solidification/stabilization of any waste, as long as the process reduces the amount of waste which leaches from the solid cementitious product resulting from the process, as compared to the same process carried out without the use of bagasse. For ease of description only, the steps of the processes of this invention will be discussed hereafter in stages, the first stage being bagasse processing, and the second step being cement preparation and curing.

Bagasse Processing

The amount of bagasse material to be used in the processes of this invention can vary, depending upon the components present in the mixture and their relative amounts. Typically, the amount used will be in the range of about 1% to about 20% by weight to cement, and preferably about 10% by weight to cement.

In the step of combining bagasse and a liquid medium, the bagasse and liquid medium may be combined one into the other or concurrently. The liquid medium should have a pH which is below about 4 or above about 10, and more preferably which is below about 3 or above about 12. Typically, the liquid medium may be comprised of any acid or base which does not interfere with the hydration of cement in the mixture, and preferably is comprised of either a metal hydroxide, most preferably sodium hydroxide, or a hydrogen halide, most preferably hydrogen chloride.

The temperature at which the heated mixture is maintained may vary widely, depending upon variables such as, e.g., pressure, relative proportions of the mixture components, time, etc., so long as the temperature is sufficient to permit sugars in the bagasse to be released into the mixture. However, as noted earlier, preferably the temperature at which the mixture is maintained will be at least at one temperature in the range of about 80 to about 120° C., and more preferably in the range of about 90 to about 110° C. As noted earlier, the time period during which the mixture is maintained at least at one temperature in the specified range is preferably a period of at least about 30 minutes, and more preferably about 60 minutes, measured from the point in time at which the mixture reaches at least one temperature in the specified range.

Separating the mixture into solid matter and filtrate can be carried out through any suitable method under the circumstances, but is preferably conducted by filtration. The solid matter may thereafter be washed with a liquid in which sugar is soluble. This liquid may be comprised of, for example, any polar solvent, but is preferably comprised of water.

The resulting solid matter is then mixed with liquid medium having the same pH characteristics as described above and the process of heating the mixture and separating the filtrate and the solid matter from one another is repeated until the filtrate is substantially colorless (i.e., transparently clear with little or no color) under ambient light conditions. The resulting solid matter is thus washed solid matter in that sugars found in the bagasse have been substantially extracted therefrom.

Cement Preparation and Curing

The washed solid matter may be combined with the waste, water and cement in any given order, series of sub-combination steps, or concurrently. However, preferably, prior to combining at least a portion of the washed solid matter with at least the waste, water, and a cement, the washed solid matter is dried and pulverized. The step of drying the washed solid matter may be carried out by any known method, including for example by use of a vacuum, application of heat, etc. Pulverizing the dried, washed solid matter can be performed by any method in which a force is applied to the solid matter to break it into small particle sizes through the use of, e.g., grinders, screens, beaters, etc., so long as the washed solid matter has an average particle size in the range of about 100 to about 500 microns, and more preferably in the range of about 150 to about 350 microns. In this way, the surface area of the solid material which is exposed to the cement and the waste thereafter is maximized in such a way as to enable particularly effective binding of the waste in the solid matrix upon curing.

As noted earlier, it is particularly preferred that the step of combining the washed solid matter with at least the waste, water and cement to form the cement slurry be carried out by (a) mixing at least a portion of the washed solid matter with the waste and water to form a waste slurry, (b) maintaining at least a portion of the waste slurry in a substantially quiescent state for a period of at least 30 minutes, and more preferably for a period of at least 60 minutes, and (c) combining at least a portion of the waste slurry with the cement to form the cement slurry. In this process, the waste slurry may be formed by mixing the washed solid matter with the waste and water in any given order, sub-combination sequence, or concurrently. Likewise, the waste slurry and cement may be mixed one into the other or combined together concurrently.

Suitable cements for use in the practice of this invention may include, for example, an Portland cement type, White cement, Masonry cement, rubber-containing cement, etc. A preferred cement is the commercially available Portland cement, type I. The cure time for use in curing the cement slurry in processes of this invention may vary and can depend upon many variable, such as volume, surrounding atmospheric conditions, and proportions of slurry components. Typical cure time may be, for example, about 1 or more days, preferably at least about 7 days, more preferably at least about 14 days, and most preferably at least about 28 days. The curing temperature can vary depending upon other ambient conditions, e.g., pressure and humidity, but preferably is at least one temperature in the range of about 15 to about 35° C., and more preferably in the range of about 20 to about 30° C. Using temperatures in these ranges appears to improve the likelihood of particularly satisfactory stabilization of the waste in the matrix.

What follows are examples of particularly preferred processes of this invention and the solidifcation/stabilization results obtained.

EXAMPLE 1

Batch 1: Bagasse (60 grams) in 1000 ml of 0.1 M hydrochloric acid was heated to boiling and boiled for approximately 45 minutes, and the residual solid product was separated from the filtrate and washed free of sugars and acids formed during hydrolysis with tap water. The solid product was again boiled in 1000 ml of 0.1 M hydrochloric acid and separated from the filtrate and washed with tap water. These steps were repeated two more times until the filtrate was substantially colorless under ambient light conditions. The residual solid product was oven dried at 110° C. overnight and pulverized by being pressed against a wire screen to achieve an average particle size of 200 microns.

A portion of the ground residual solid product (15 g) and a lead nitrate solution comprised of 46 g lead nitrate (sometimes abbreviated hereinafter as "Pb" or "lead") dissolved in 120 ml of deionized water were mixed together using a normal household blender at low speed for 1–2 minutes until all of the bagasse was saturated. This mixture was left in a quiescent state for approximately 1 hour. Ordinary Portland cement type I (294 g) was added to the mixture and the mixture was mixed with a stirring rod until all cement was moist. An additional 42 g of water were added to the mixture, giving a total a composition of 10% lead/5% bagasse by weight to cement and a water/cement ratio of 0.55, and the mixture was blended on high speed for 5 minutes with periodic scraping of the side of the blender. Approximately 20 grams of the mixture was scooped into a 20-ml borosilicate screw-cap vial. Twelve (12) such vials were prepared, 4 for each cure period (7, 14 and 28 days). Care was taken to insure that representative samples were taken from the top, middle and bottom of the blender for each cure period. Once the samples were made, the vials were capped and stored in a standard laboratory oven at 24° C. for their respective cure periods (7, 14 or 28 days).

Batch 2: The above procedure for Batch 2 was repeated, with the exception that 0.1 M sodium hydroxide was substituted for 0.1 M hydrochloric acid used in the first batch. A control batch was also prepared according to the above procedure, except that the prepared lead solution was cured with the cement without addition of any prepared material derived from bagasse.

Each vial from the first Batches 1 and 2 and the control batch was separately placed into a wide-mouth plastic bottle, and the vial was broken by striking it with a steel rod. The whole sample plug was removed from the glass. The entire sample was crushed with a steel rod, and particles between 8.0 and 9.5 mm were retained while all particles smaller than 8.0 mm were eliminated to ensure reproducibility. The mass of the entire amount of each sample was recorded (average sample mass: 9.50 g of the original 20-g bulk batch) and placed into a 250 ml Nalgene wide-mouth HDPE bottle.

To each sample was added Toxicity Characteristic Leaching Procedure (TCLP) leachant No. 2 (5.7 ml/l glacial acetic acid aqueous solution at pH 2.88) at a volume of 20 times the weight of the sample. The extraction period for the sample was 18 hours under rotary agitation at 30 rpm. Then, the sample was filtered using Grade FG/F 0.7 $\mu$m glass-fiber filter paper. The sample was filtered within 2 hours of the 18 hour extraction period to ensure reproducibility. The filtrate was acidified using concentrated nitric acid and analysis for lead was performed using a Perkin-Elmer Model 5000 atomic absorption spectrometer at 283.3 nm. It was estimated that if all lead was extracted from the solidified matrix, concentration of lead in the leachate would be approximately 3000 mg/l. This procedure differed from the EPA TCLP experimental protocol, at 51 Federal Register 21672–21692 (No. 114, Jun. 13, 1986), in that one-tenth of the amount of sample was used (10 grams rather than 100 grams).

The results for Batches 1 and 2, and the control batch, are summarized in the following Table 1.

TABLE 1

Lead Concentrations in TCLP Leachates
(Pb Leached in mg/l; mean ± standard deviation, n = 4)

| Batch | Days of Cure | | |
|---|---|---|---|
| | 7 | 14 | 28 |
| control | 6.7 ± 1.3 | 4.9 ± 1.2 | 3.8 ± 0.5 |
| 1 (acid; bagasse) | 1.0 ± 0.1 | <0.5 | <0.5 |
| 2 (base; bagasse) | <0.5 | <0.5 | <0.5 |

EXAMPLE 2

The procedure for Example 1, Batch 1, was repeated for different samples in which the amount by weight of bagasse relative to the amount by weight of cement was varied from sample to sample, and for other samples in which the amount by weight of lead relative to the amount by weight of cement was varied from sample to sample. These samples were tested using the Toxicity Characteristic Leaching Procedure of Example 1, and the results of these tests are set forth in Tables 2 and 3 below.

TABLE 2

Lead Concentrations in TCLP Leachates
(Pb Leached in mg/l; mean ± standard deviation, n = 4)

| % lead by wt. to cement | % bagasse by wt. to cement | Days of Cure | | |
|---|---|---|---|---|
| | | 7 | 14 | 28 |
| 10 | 0 | 6.7 ± 1.3 | 4.9 ± 1.2 | 3.8 ± 0.5 |
| 10 | 1.2 | Not Recorded (N/R) | 3.4 ± 1.1 | <0.5 |
| 10 | 2.5 | 2.3 ± 0.8 | <0.5 | <0.5 |
| 10 | 5 | 1.0 ± 0.1 | <0.5 | <0.5 |

TABLE 3

Lead Concentrations in TCLP Leachates
(Pb Leached in mg/l; mean ± standard deviation, n = 4)

| % lead by wt. to cement | % bagasse by wt. to cement | Days of Cure | | |
|---|---|---|---|---|
| | | 7 | 14 | 28 |
| 10 | 0 | 6.7 ± 1.3 | 4.9 ± 1.2 | 3.8 ± 0.5 |
| 15 | 0 | 42 ± 7 | 44 ± 3 | 53 ± 8 |
| 20 | 0 | >40 | >40 | >40 |
| 10 | 5 | 1.0 ± 0.1 | <0.5 | <0.5 |
| 15 | 5 | N/R | 0.73 ± 0.29 | <0.5 |
| 20 | 5 | >40 | >40 | >40 |

EXAMPLE 3

Example 1 (Batch 1) was repeated, except that the waste which was solidified was 90 grams of sodium chromate tetrahydrate (sometimes abbreviated hereinafter as "Cr" or "chromium"). The resulting samples were tested using the Toxicity Characteristic Leaching Procedure of Example 1, and the results of these tests are set forth in Table 4 below.

TABLE 4

Chromium Concentrations in TCLP Leachates
(Chromium Leached in mg/l; mean ± standard deviation, n = 4)

| % Cr by wt. to cement | % bagasse by wt. to cement | Days of Cure | | |
|---|---|---|---|---|
| | | 7 | 14 | 28 |
| 10 | 0 | 1650 ± 21 | 1590 ± 62 | 1330 ± 47 |
| 10 | 5 | 941 ± 26 | 868 ± 62 | 876 ± 26 |

As now may be appreciated from the above examples, cure times and the relative amounts of bagasse to cement, and waste to cement, employed in processes of this invention can affect the amount of leaching which may occur from the resulting solid cementitious product. However, in every case, the presence of material processed from bagasse resulted in a significant reduction in the amount of waste leached from the solid product.

This invention is susceptible to considerable variation in its practice. Therefore the foregoing description is not intended to limit, and should not be construed as limiting, the invention to the particular exemplifications presented above. Rather, what is intended to be covered is as set forth in the ensuing claims and the equivalents thereof permitted as a matter of law.

That which is claimed is:

1. A process for solidifying and stabilizing waste, the process comprising:
   (a) combining bagasse and a liquid medium having a pH below about 4 or above about 10 to form a mixture,
   (b) heating the mixture,
   (c) separating the mixture into solid matter and filtrate and washing the solid matter with a liquid in which sugar is soluble,
   (d) substituting the solid matter for the bagasse in (a) and repeating steps (a) through (c) until the filtrate is substantially colorless under ambient light conditions, thereby producing washed solid matter,
   (e) combining at least a portion of the washed solid matter with at least (1) the waste, (2) water, and (3) a cement, so as to form a cement slurry, and
   (f) curing the cement slurry.

2. A process according to claim 1, further comprising the step of maintaining the mixture at a temperature in the range of about 80 to about 120° C. for a period of at least about 30 minutes prior to separating the mixture into solid matter and filtrate.

3. A process according to claim 2, wherein the mixture is maintained at least at one temperature in the range of about 90 to about 110° C. for a period of at least about 60 minutes prior to separating the mixture into solid matter and filtrate.

4. A process according to claim 1, wherein before combining the washed solid matter with at least the waste, water and the cement to form the cement slurry, the process further comprises:
   (a) drying at least a portion of the washed solid matter, and
   (b) pulverizing at least a portion of the washed solid matter so that the washed solid matter has an average particle size in the range of about 100 to about 500 microns.

5. A process according to claim 4, wherein the washed solid matter has an average particle size in the range of about 150 to about 350 microns.

6. A process according to claim 4, wherein the step of combining the washed solid matter with at least the waste, water and the cement to form the cement slurry is carried out by a process which comprises:
   (a) mixing at least a portion of the washed solid matter with the waste and water to form a waste slurry,
   (b) maintaining at least a portion of the waste slurry in a substantially quiescent state for a period of at least 30 minutes, and
   (c) combining at least a portion of the waste slurry with the cement to form the cement slurry.

7. A process according to claim 6, wherein the waste slurry is maintained in a substantially quiescent state for a period of at least 60 minutes.

8. A process according to claim 7 wherein the cement slurry is cured at least at one temperature in the range of about 15 to about 35° C.

9. A process according to claim 6 wherein the cement slurry is cured at least at one temperature in the range of about 15 to about 35° C.

10. A process according to claim 1 wherein the cement slurry is cured at least at one temperature in the range of about 15 to about 35° C.

11. A process according to claim 9 wherein the cement slurry is cured at least at one temperature in the range of about 20 to about 30° C.

12. A process according to claim 1 wherein the liquid medium comprises a hydrogen halide.

13. A process according to claim 1 wherein the liquid medium comprises a metal hydroxide.

14. A process according to claim 1 wherein the liquid in which sugar is soluble comprises water.

15. A cementitious product formed using the process of claim 1.

16. A cementitious product formed using the process of claim 2.

17. A cementitious product formed using the process of claim 4.

18. A process for solidifying and stabilizing waste, the process comprising:
   (a) combining bagasse and a liquid medium having a pH below about 3 or above about 12 to form a mixture,
   (b) heating the mixture and maintaining the mixture at least at one temperature in the range of about 90 to about 110° C. for a period of at least about 30 minutes,
   (c) separating the mixture into solid matter and filtrate and washing the solid matter with a liquid in which sugar is soluble,
   (d) substituting the solid matter for the bagasse in (a) and repeating steps (a) through (c) until the filtrate is substantially colorless under ambient light conditions, thereby producing washed solid matter,
   (e) drying the washed solid matter,
   (f) pulverizing at least a portion of the washed solid matter so that the washed solid matter has an average particle size in the range of about 100 to about 500 microns,
   (g) mixing at least a portion of the washed solid matter with the waste and water to form a waste slurry,
   (h) maintaining at least a portion of the waste slurry in a substantially quiescent state for a period of at least 30 minutes,
   (i) combining at least a portion of the waste slurry with a cement to form a cement slurry, and
   (j) curing the cement slurry at least at one temperature in the range of about 20 to about 30° C.

19. A process according to claim 17, wherein the liquid medium comprises a hydrogen halide.

20. A process according to claim 19, wherein the hydrogen halide is hydrogen chloride.

21. A process according to claim 17, wherein the liquid medium comprises a metal hydroxide.

22. A process according to claim 21, wherein the metal hydroxide is sodium hydroxide.

23. A cementitious product formed using the process of claim 18.

24. A cementitious product formed using the process of claim 19.

25. A cementitious product formed using the process of claim 21.

* * * * *